United States Patent [19]

Lindner et al.

[11] Patent Number: 5,743,516
[45] Date of Patent: Apr. 28, 1998

[54] SHOCK ABSORBING DEVICE FOR RUNNING TROLLEYS FOR FILM STRETCHING PLANTS IN PARTICULAR

[75] Inventors: Paul Lindner, Henndorf, Austria; Ulrich Rühlemann, Grabenstätt, Germany

[73] Assignee: Bruckner Maschinenbau GmbH, Siegsdorf, Germany

[21] Appl. No.: 669,422

[22] PCT Filed: Nov. 7, 1995

[86] PCT No.: PCT/EP95/04379

§ 371 Date: Jul. 9, 1996

§ 102(e) Date: Jul. 9, 1996

[87] PCT Pub. No.: WO96/16278

PCT Pub. Date: May 30, 1996

[30] Foreign Application Priority Data

Nov. 17, 1994 [DE] Germany .................. 44 41 020.4

[51] Int. Cl.⁶ .................................................. B60G 11/34
[52] U.S. Cl. ............................................ 267/30; 267/140
[58] Field of Search ............................. 267/30, 140, 136, 267/139, 151–153, 36.1; 26/73

[56] References Cited

U.S. PATENT DOCUMENTS

| | | | |
|---|---|---|---|
| 2,557,610 | 6/1951 | Meyers et al. | 267/30 X |
| 2,661,943 | 12/1953 | Wilbur | 267/30 X |
| 4,675,582 | 6/1987 | Hommes et al. | |
| 4,825,111 | 4/1989 | Hommes et al. | |
| 4,853,602 | 8/1989 | Hommes et al. | |
| 5,051,225 | 9/1991 | Hommes et al. | |

FOREIGN PATENT DOCUMENTS 1151730  2/1958  France .................. 267/140

*Primary Examiner*—Peter M. Poon
*Attorney, Agent, or Firm*—Nixon & Vanderhye

[57] ABSTRACT

An improved shock absorber device including first and second shock absorbers. The spring characteristics of the shock absorbers provide a jump function. The position and size of the differential force value in the region of the spring characteristics are such that, when propulsive and shock forces occur with a force value within the differential force value, the second shock absorber is not activated and the first shock absorber has already reached its maximum shock absorbing limit.

13 Claims, 5 Drawing Sheets

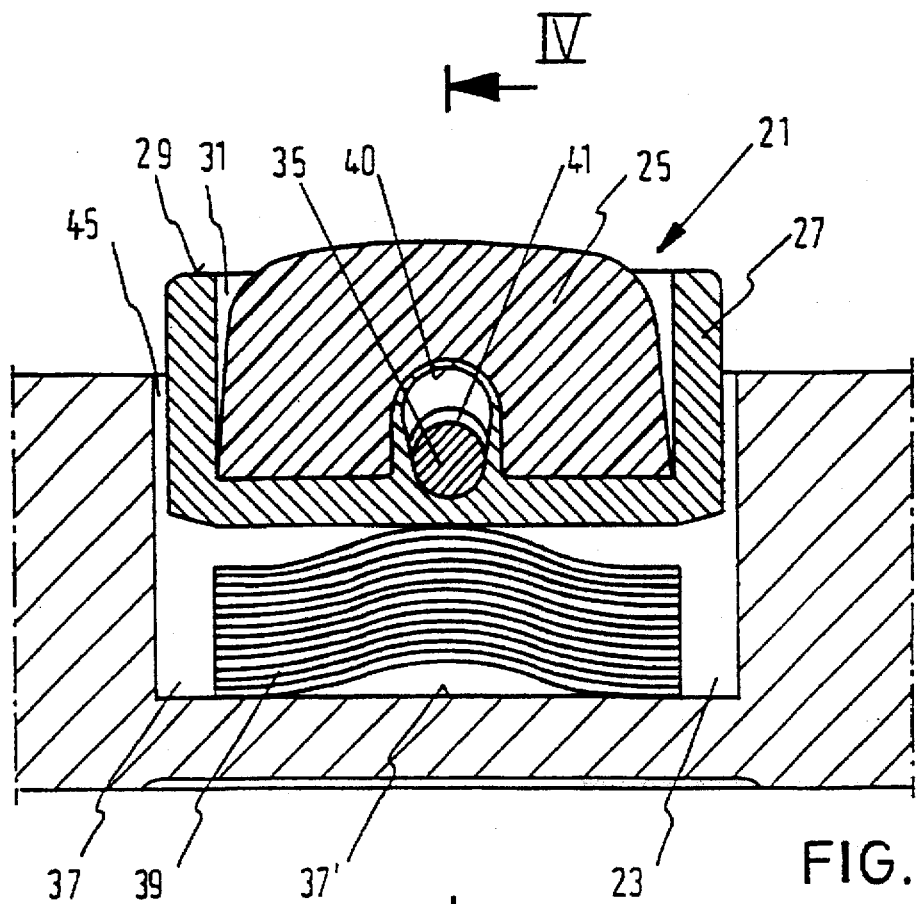
FIG. 3
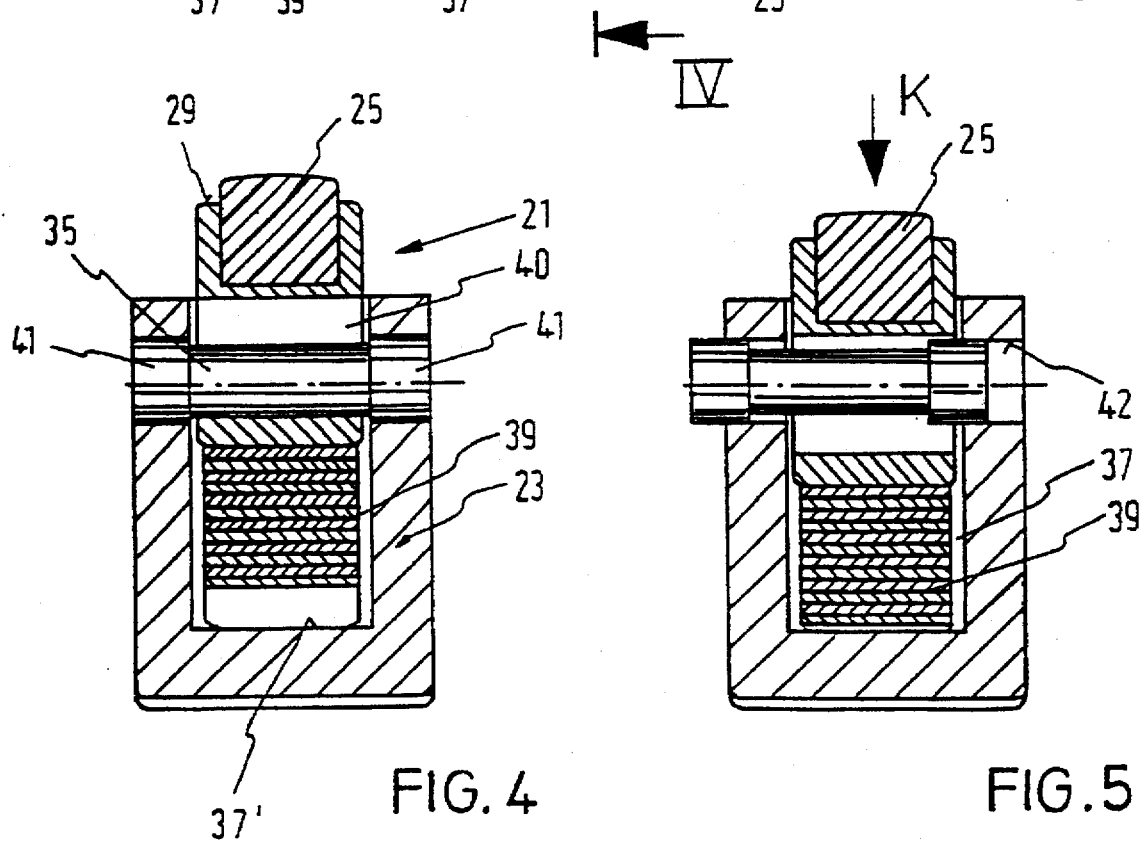
FIG. 4
FIG. 5

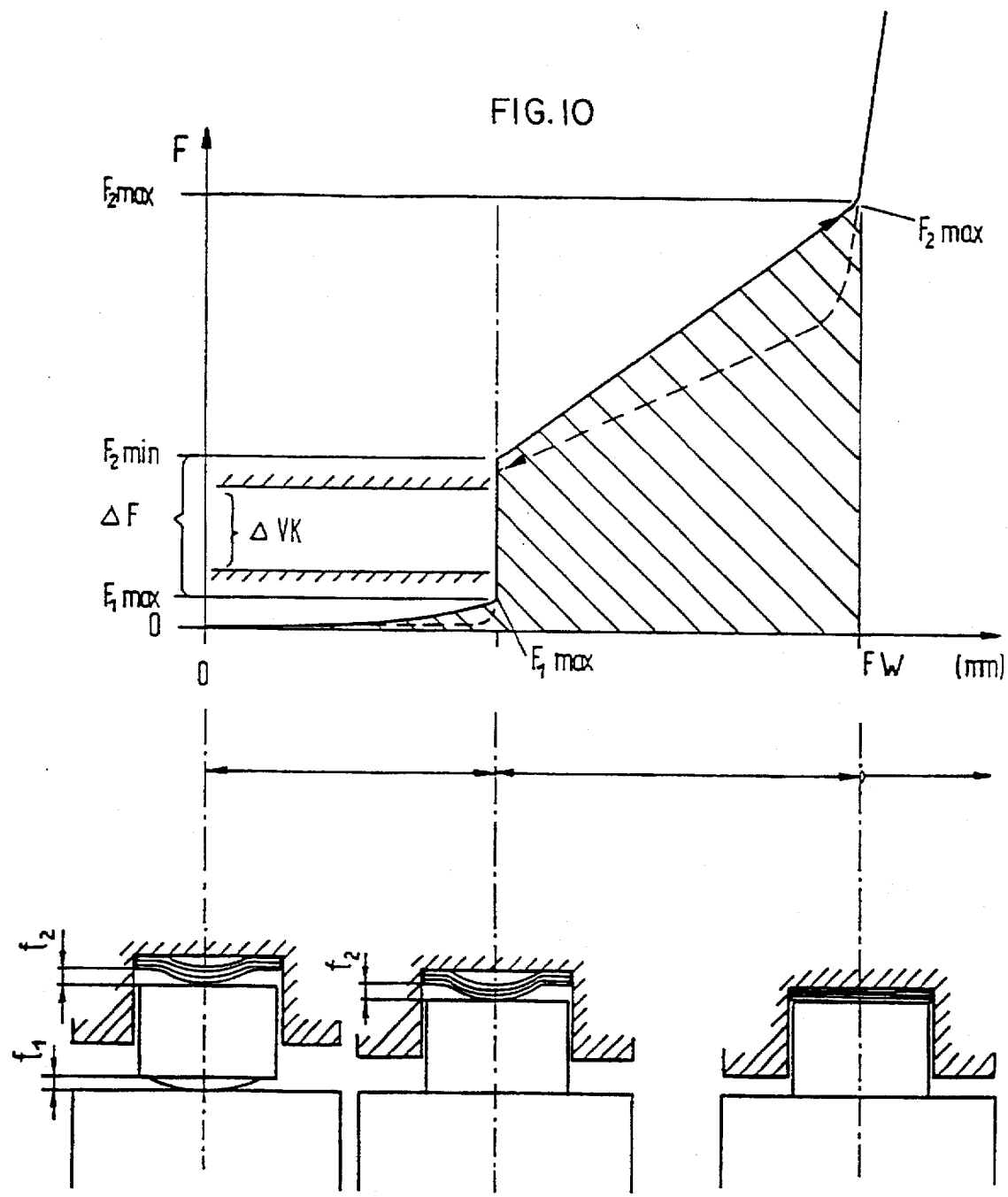

SHOCK ABSORBING DEVICE FOR RUNNING TROLLEYS FOR FILM STRETCHING PLANTS IN PARTICULAR

The invention relates to a shock absorber for running trolleys for film stretching plants.

U.S. Pat. No. 5,072,493 has disclosed a simultaneous film stretching plant, in which the individual running or tenterhook trolleys can be moved freely without the use of otherwise conventional chain levers. In this case, the drive takes place by means of a linear motor.

By means of the tenterhooks located on the running trolley, the film edge is grasped on the left and right in each case and the film is then stretched in the transverse and longitudinal directions according to the geometry of the running rails. The distance between the running trolleys thereby becomes increasingly greater. In a runout zone, the distance can become slightly smaller again, in order to carry out some shrinkage of the film web here in a predefined ratio.

Transport systems with tenterhooks not connected by chain levers, that is to say tenterhooks or running trolleys, have regions, in which the adjacent running or tenterhook trolleys are not in contact with one another. The requirements demanded of these transport systems are:

- an exact reproducible distance between the tenterhooks during the introduction of the film (in this region—the so-called stack—the tenterhook trolleys are moved together in abutment; and
- force transmission from tenterhook to tenterhook, that is to say for the drive and for the advancing movement of the individual running or tenterhook trolleys (the propulsive and restraining forces should not change the distance between the tenterhooks until the commencement of the stretching zone).

These requirements are satisfied in the prior art by fixed stops in the tenterhook structure. Furthermore, constructions having an elastomeric shock absorber with a small working stroke and with low energy absorption have also become known. After the damping stroke of the elastomer is spent, these tenterhooks likewise butt on one another by means of their stops formed fixedly by the tenterhook structure. In the so-called stack upstream of the actual stretching zone, the shock absorbers then always have to be compressed as far as the stop, in order, when the film is grasped, to ensure a predetermined distance from tenterhook to tenterhook which is to be maintained exactly.

However, the above-described simultaneous stretching plants, using tenterhook or running trolleys not connected by chain levers, cause considerable loads on the transport system as a whole:

- in the normal operating state, the tenterhooks butt on one another at a slight differential speed, for example during the so-called stack formation (upstream of the stretching zone). At the same time, the hard metallic shocks between the tenterhooks exert a load not only on the running rollers of the tenterhook trolleys, but also on the rails themselves. On account of the ever-present disproportion between the drive force and the different friction losses, even tenterhooks with large elastomeric shock absorbers cannot avoid hard shocks entirely.
- in the event of operating faults or when the running behavior of the tenterhooks during the return varies nonuniformly with the service life, collisions may occur at sometimes extreme differential speeds, said collisions leading to considerable damage to running rollers, rails and the tenterhook structure itself. At the very least, the fixed stop part is consequently subjected to plastic deformation, with the result that the tenterhook spacing (that is to say, the exact distance from tenterhook to tenterhook in the so-called stack upstream of the stretching zone) is lost. However, a distance between the tenterhooks which is brought about thereby and which changes even only slightly, in the so-called collecting region (stack region) upstream of the stretching zone, then leads, on account of the undesirable changing stretching ratio caused thereby, to a corresponding adverse impairment in the plastic film web to be produced by stretching.

Furthermore, a constant tendency for the plant speed, that is to say the running speed of the running or tenterhook trolleys, always to increase even further is to be noted. However, the dynamic loads consequently become inadmissibly high.

Nevertheless, in some known shock absorber devices, an increase in energy absorption is not possible, even with other constructional elements from spring technology. In particular, the result of an increase in the energy absorption of the elastomeric shock absorbers would be that, with increasingly higher forces, the elastomeric shock absorbers undergo increasingly greater deformation. As a result, however, particularly in the stack, the necessary exact tenterhook spacing which is unreservedly to be maintained, that is to say an exactly identical distance from tenterhook to tenterhook, could no longer be set, since said distance would then also be dependent on the propulsive forces and, in turn, inadmissible variations in the distance between the tenterhooks would thereby be brought about.

The object of the present invention is, therefore, to overcome the disadvantages of the prior art and to provide an improved shock absorber device particularly for simultaneous stretching plants having tenterhooks not connected by chains.

The present invention provides a shock absorber device, such as is suitable particularly for simultaneous stretching plants, in which the individual running or tenterhook trolleys, which are not connected mechanically to one another, are driven, for example, by means of a linear motor drive. At the same time, the shock absorber device according to the invention meets numerous requirements guaranteeing a continuous and reliable operation of a stretching plant of this type, namely:

- smooth interception of running or tenterhook trolleys which run onto one another at low differential speed. In this case, reversible deformation is preferred under these normal operating conditions, in order to guarantee as long a continuous operation as possible without other technical measures.
- even at high differential speeds, absorption of high dynamic energies without any damage at all to the running rollers, rail or tenterhooks, that is to say consequently to the running or tenterhook trolleys, is in general guaranteed, and this likewise preferably again being along the lines of a reversible absorption of these dynamic forces and energies.
- however, even at high differential speeds, in addition to shock damping as a result of energy absorption by the spring means (a first and a second shock absorber means), a damping of the shock can, moreover, additionally be brought about by energy conversion.
- upstream of the immediate stretching zone (stack), the desired exact tenterhook spacing, that is to say an exactly uniform distance from tenterhook to tenterhook, can be maintained in a reproducible manner upstream of the stretching zone by limiting the spring force of the shock absorber to a maximum damping force.

a preferred embodiment of the invention also guarantees that the shock absorber device is just as effective even on bends and at reversals.

even in routine maintenance or in a repair situation in general, the shock absorber device according to the invention allows easy exchangeability of the impact parts which may possibly be adversely affected in the collision.

The shock absorber device according to the invention is suitable particularly for running trolleys for simultaneous stretching plants. However, the shock absorber device is also suitable for all other trolleys to be protected against collisions, irrespective of whether they are railborne or not or are moved by other steering or guiding means. The term "running trolley" is therefore not to be understood restrictively only in the sense of a trolley equipped with running rollers. Suspended, floating or sliding arrangements are also likewise to be understood by the term "running trolley".

Further advantages, details and features of the invention emerge below from the exemplary embodiment represented by means of drawings. In these, in particular:

FIG. 3 shows an enlarged detailed representation of the shock absorber device on a running trolley;

FIG. 4 shows a sectional representation along the line IV—IV in FIG. 3;

FIG. 5 shows a representation corresponding to that of FIG. 4, to explain the assembly of the shock absorber device according to the invention;

FIG. 10 shows a diagram with three state representations to explain the spring/shock absorber characteristic (the representation shows the spring force F against the spring excursion FW in mm).

Figure 1:
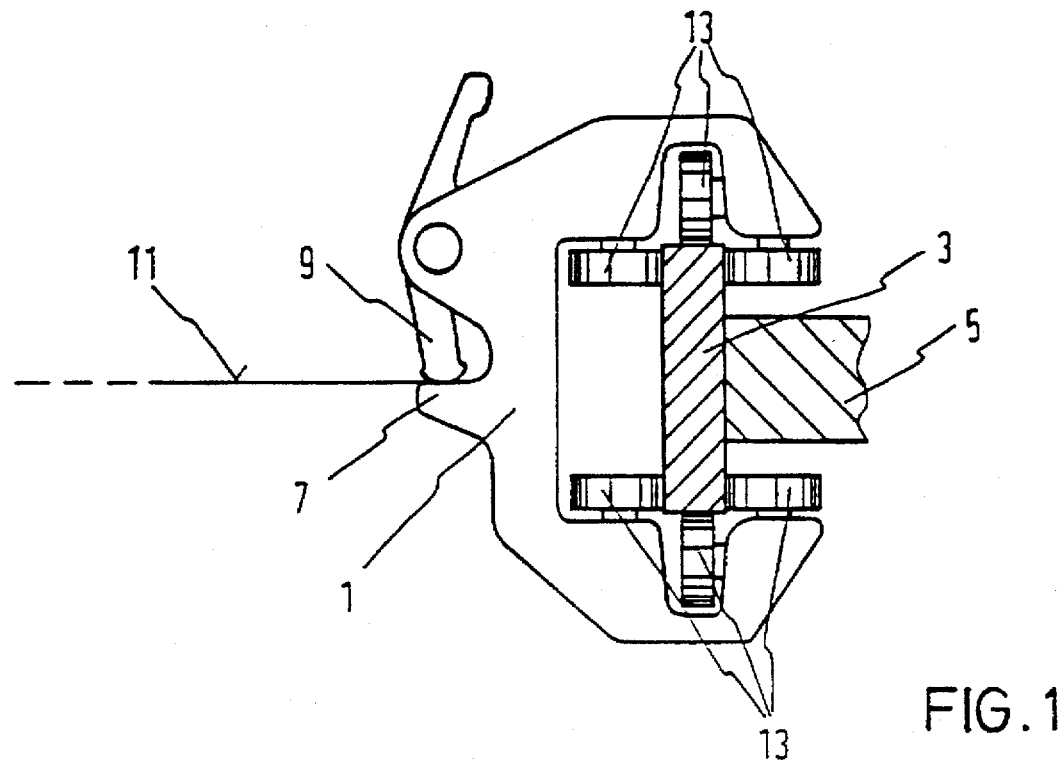
FIG. 1 shows a running trolley movable along a running rail in a view parallel to the running rail.
Figure 2:
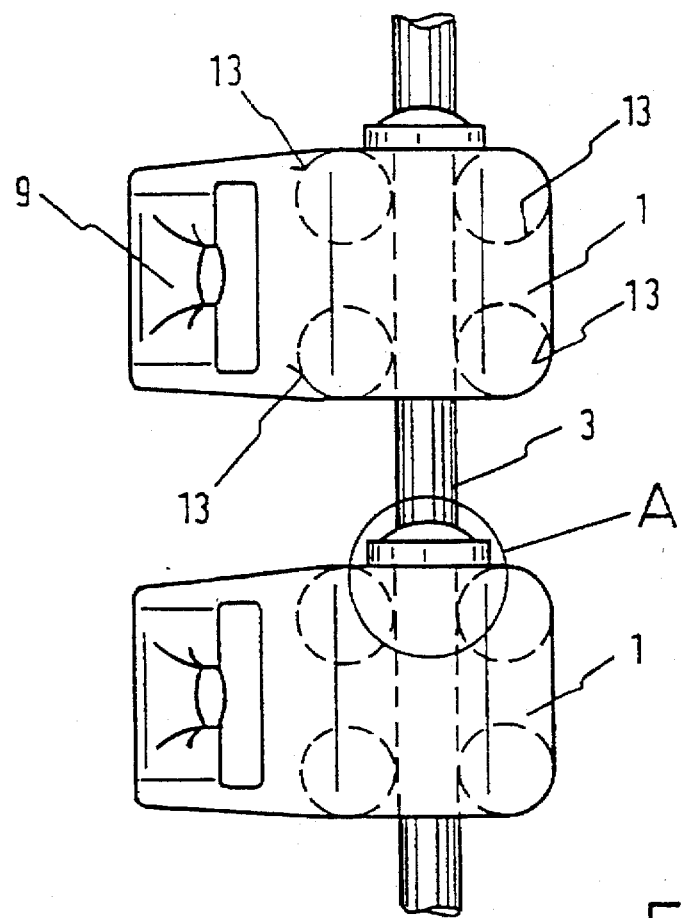
FIG. 2 shows a top view of two running trolleys movable at a distance from one another along a running rail.

FIGS. 1 to 3 show a tenterhook trolley which is also designated below as a running trolley 1 and which is moved along a running rail 3 which has a rectangular cross section in the exemplary embodiment shown and which is held and anchored on a lateral carrier 5 shown in cutout form. As is known, the running trolleys 1 comprise, for example, a tenterhook table 7, on which the edge of a film web 11 to be stretched can be grasped and retained by means of a movable tenterhook lever 9.

The, exemplary embodiment explained relates to running trolleys 1 with tenterhooks, such as are used, for example, for a simultaneous plastic film stretching plant. In the exemplary embodiment explained, the individual running trolleys 1 are not connected to one another via a chain lever mechanism, via which the distance between the tenterhooks is set, but, in contrast to this, are driven in a controlled manner, for example by means of a linear motor drive, on their path of rotation along the running rail 3 at a varying distance from an adjacent running trolley. The running trolleys 1 comprise horizontal and vertical running rollers 13, via which they roll and are moved along the rail 3.

The shock absorber device identified in FIG. 2 by a dot-and-dash circle A is now shown in diagrammatic cross section in FIGS. 3 to 5.

It is evident from these that the shock absorber device comprises a two-stage design with a first shock absorber means 21 and with a second shock absorber means 23.

The first shock absorber means 21 has an elastomeric insert 25 which is arranged in a pot-shaped insertable reception part 27.

In the nonloaded state, the elastomeric insert 25 projects above the edge 29 of the pot-shaped insertable reception part 27, the edge 29 simultaneously forming a stop likewise identified below by the reference symbol 29 (the importance of which stop is discussed further at a later stage).

The shaping of the elastomeric insert 25 is such that there is formed between the inner wall of the pot-shaped insertable reception part 27, at least adjacently to its edge 29 and the contiguous wall of the elastomeric insert 25, a reception space 31 which is free in the nonloaded state and into which the elastomeric element, preferably of deformable volume, can be deformed in the event of a collision with an adjacent running trolley.

The pot-shaped insertable reception part 27 (which, in a top view, does not necessarily only have to be round, but can, for example, also have a shape which is square or rectangular or different from these) is accommodated by means of a holding bolt 35 so as to penetrate into a corresponding reception space 37 and protrude from the latter.

As emerges from the representation according to FIGS. 3 to 5, the second shock absorber means 23 is provided in the reception space 37, said second shock absorber means preferably consisting of a leaf spring assembly 39 which is supported on the bottom 37' of the reception space and which, as early as in the nonloaded initial state, subjects the underside of the pot-shaped insertable reception part 27 to pressure and, via this, presses the pot-shaped insertable reception part 27 into the stop-limited initial position shown in FIGS. 3 and 4. In this initial position, the pot-shaped insertable reception part 27 is pressed onto the stop formed by the holding bolt 35.

The assembly of the pot-shaped insertable reception part 27 is evident from FIGS. 4 and 5.

The insertable reception part 27 has a bore which is shown in cross section in FIGS. 3 to 5 and which is pear-shaped, that is to say is formed with a widened slot 40 extending in the direction away from the leaf spring assembly 39. The holding bolt 35 has, on each of its opposite end faces, a collar 41 with a larger outside diameter than in its middle portion, the outside diameter of the collar 41 being smaller than or equal to the widened bore cross section 40. For assembly, the pot-shaped insertable reception part 27 is pressed counter to the force of the leaf spring assembly 39 into the reception space 37 in the running trolley 1 in the direction of the arrow K, until the leaf springs 39 are plane-parallel to the bottom 37'. In this position shown in FIG. 5, the holding bolt 35 can then be inserted through the widened bore cross section 40. The leaf spring assembly 39 can then be relieved, with the result that the pot-shaped insertable reception part 27 is displaced from its assembly position shown in FIG. 5 into the neutral initial position shown in FIGS. 3 and 4. At the same time, the insertable reception part 27 is displaced by the leaf spring assembly 39 again, opposite to the direction of the arrow K, from the position shown in FIG. 5 into the initial position which is stop-limited in FIG. 4 and in which the holding bolt 35 passes through the bore portion 40 having a smaller bore radius, in this position said collar portions 41 located outside on the end faces covering this reduced bore radius outside the insertable and reception part 27 and the holding bolt 35 thereby being held so as to be axially non displaceable. The collar 41 provided on each end face then comes to rest in the corresponding wall portions of the running trolley 1 in a correspondingly suitable bore 42 determining the position of the holding bolt 35.

It is also evident from FIG. 3 that, between the outer edge of the pot-shaped reception part 27 and the inner wall of the reception space 37, there is a clearance 45 transversely to the axial direction of the holding bolt 35, thereby improving an appropriate adjustment of the damping element in adaption to the particular collision angle, this being discussed further below.

Figure 6:
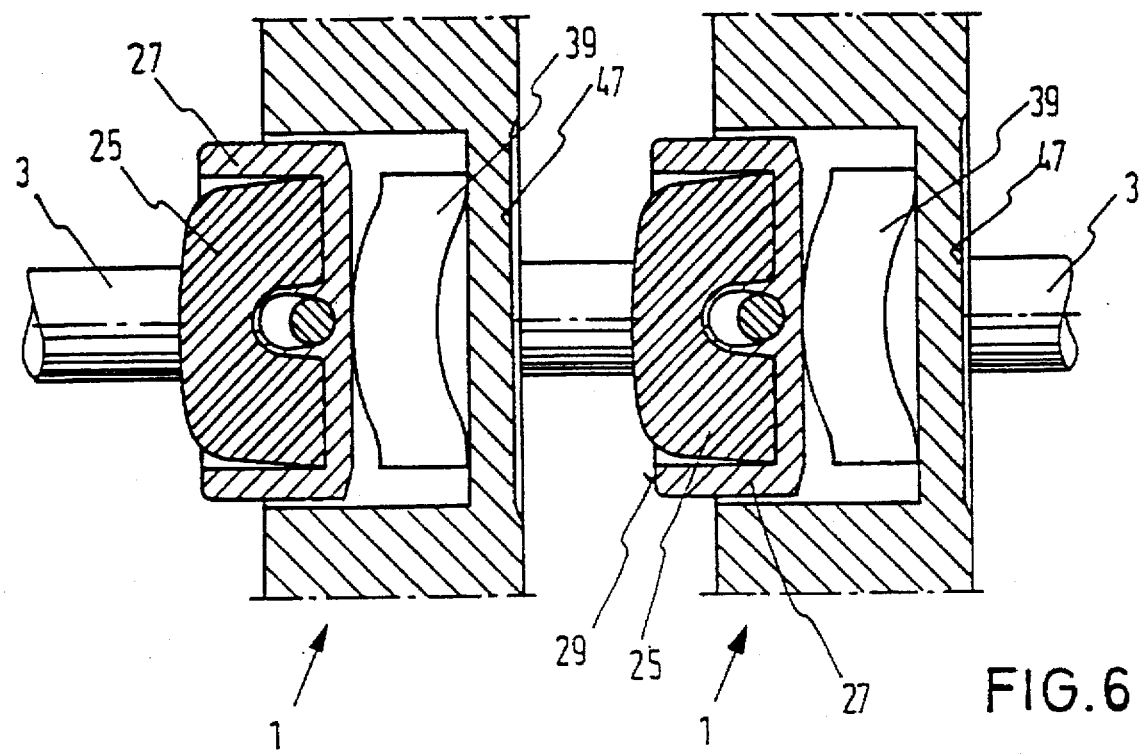
FIG. 6 shows a diagrammatic sectional representation through two shock absorber devices on two running trolleys which have not run onto one another.

In the forward and return run of a stretching plant, with the exception of the stack, the individual running trolleys 1 are moved forward in a collision-free manner at a varying distance in accordance with the stretching conditions, as represented in FIG. 6.

Figure 7:
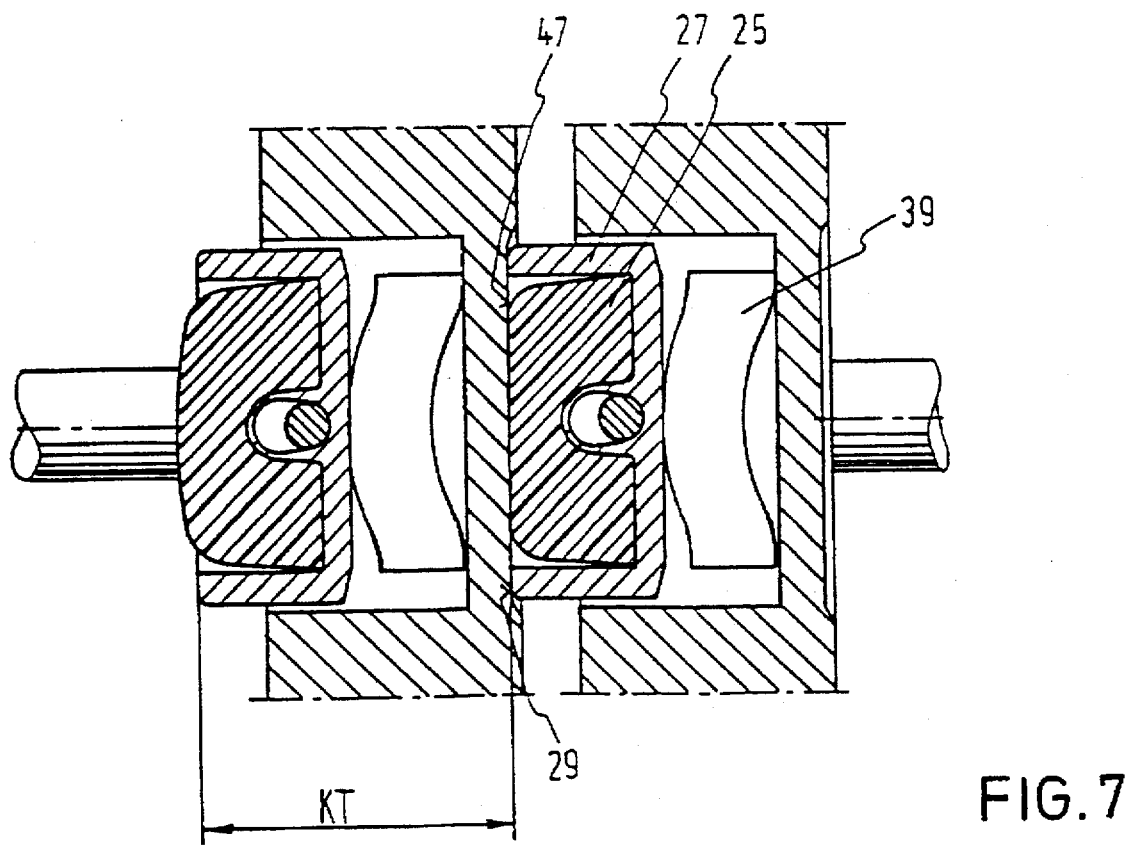
FIG. 7 shows a representation corresponding to that of FIG. 6, in which the trailing running trolley has run onto a leading running trolley, the first shock absorber means thereby being activated.
Figure 8:
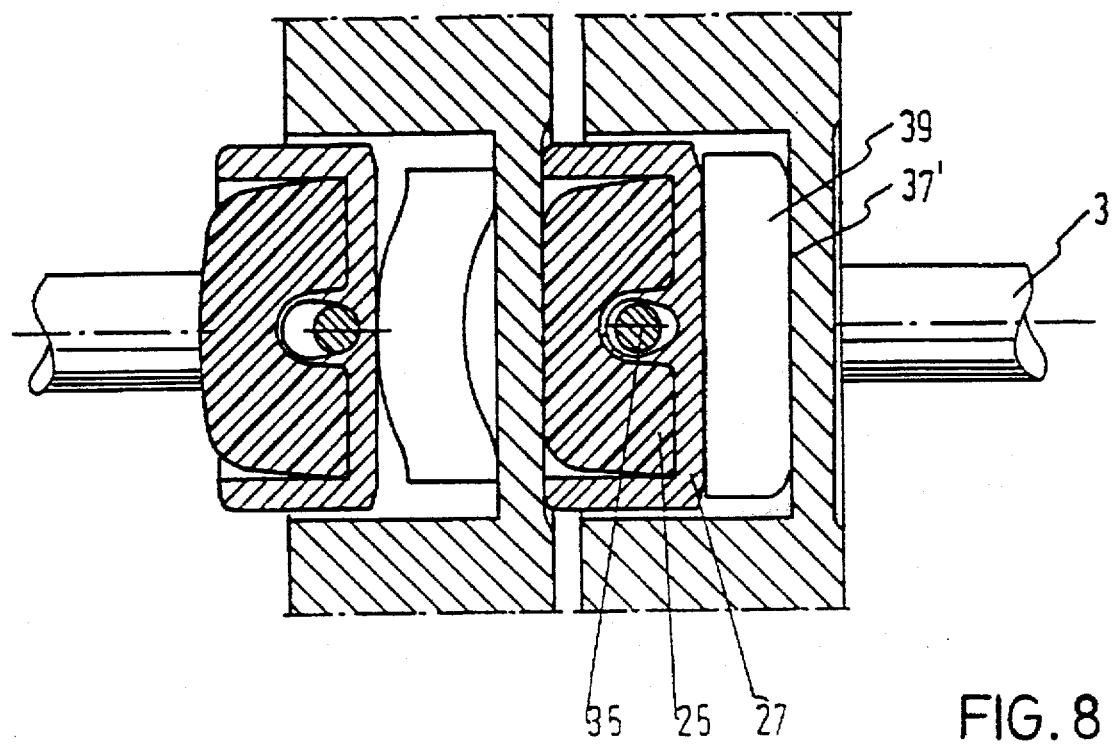
FIG. 8 shows a representation, corresponding to that of FIGS. 6 and 7, of the shock absorber means, in this representation the second shock absorber means provided also undergoing maximum deformation.

FIG. 7 shows the situation in which a trailing running trolley 1 runs into a leading running trolley 1, the elastomeric insert 25 being compressed or deformed in volume, until the stop-forming edge 29 of the pot-shaped insertable reception part 27 butts on the rear impact surface 47 of the leading running trolley 1. This is the first stage of the two-stage damping effect, via which shocks occurring at a comparatively low differential speed between two running trolleys are reversibly absorbed and damped.

As is evident from the diagram according to FIG. 10, as early as under a force $F_{1max}$ the elastomeric insert 25 is pressed completely into the pot-shaped insertable reception part 27, so that, during the subsequent butting of the edge 29 on the rear impact surface 47 of a leading running trolley 1, further deformation of the elastomeric insert 25 is prevented.

The maximum force $F_{1max}$ necessary for this purpose is markedly lower than the propulsive force in the stack zone preceding the stretching zone. The exact tenterhook spacing KT indicated in FIG. 7, that is to say the exact distance from tenterhook to tenterhook in the stack zone, is thereby always maintained in a reproducible manner.

At higher run-on forces, the second shock absorber means 23 takes effect. This absorbs the higher run-on forces, but only when a minimum force $F_{2min}$ is exceeded (FIG. 10). The springs of the force accumulator 39 are therefore designed with such a high prestress that the propulsive forces occurring in the stack zone are always safely and unequivocally below the prestressing force $F_{2min}$ and consequently prevent a displacement of the pot-shaped insertable reception part 27 counter to the force of the leaf spring assembly 39. According to the representation shown in FIG. 10, therefore, the "force jump" ΔF at the end of the range of effectiveness of the first shock absorber means 21 and before the second shock absorber means 23 begins to take effect is clearly greater than the propulsive forces occurring between the running trolleys in the stack region. As a result, exact tenterhook spacing KT in the stack region, before the start of the stretching zone, can be set in an unequivocally reproducible and exact manner.

Furthermore, FIG. 10 also shows the force range ΔVK which describes the lower and the upper limit value of the propulsive forces VK occurring in the stack region.

The two shock absorber means 21 and 23 work resiliently, in particular reversibly resiliently. They can, at the same time, also have a damping effect, that is to say absorb energy, hence shock energy, and dissipate this at least partially by energy conversion (for example, heat, etc.). In the exemplary embodiment explained, damping is achieved in the shock absorber means 21 by internal friction in the elastomeric insert 25. In the shock absorber means 23, damping is brought about by the friction between the individual leaf springs of the leaf spring assembly 39. The damping energy is indicated in the diagram according to FIG. 10. It corresponds, in this case, to the area which is enclosed by the unbroken line (compression of the respective shock absorber means) and the broken line (expansion of the respective shock absorber means).

In contrast to the slightly rising characteristic of the first shock absorber means 21, the characteristic of the shock absorber means 23 runs at a comparatively uniform and steeper gradient up to a maximum force $F_{2max}$, at which the leaf spring assembly 39 is compressed completely and the lowest leaf spring bears on the bottom 37' of the reception space 37. Under even higher shock forces, a third shock absorber means, for example made possible by the tenterhook structure as a consequence of construction, could then become active. In this case, as a consequence of the tenterhook structure, the reception space 37 of the second shock absorber means 23 can be designed to be at least slightly resilient relative to the remaining part of the running trolley 1, in order to absorb even higher shock forces.

This so-called third shock absorber means can be designed in such a way that it takes effect only after the force $F_{2max}$ has been reached, that is to say at the end of the range of effectiveness of the second shock absorber means. However, in contrast to this, it can also take effect as early as at forces which are at least slightly below the force $F_{2max}$. In this third shock absorber range too, shock absorption is to take place preferably reversibly and, if possible, even in a damping manner.

Figure 9:
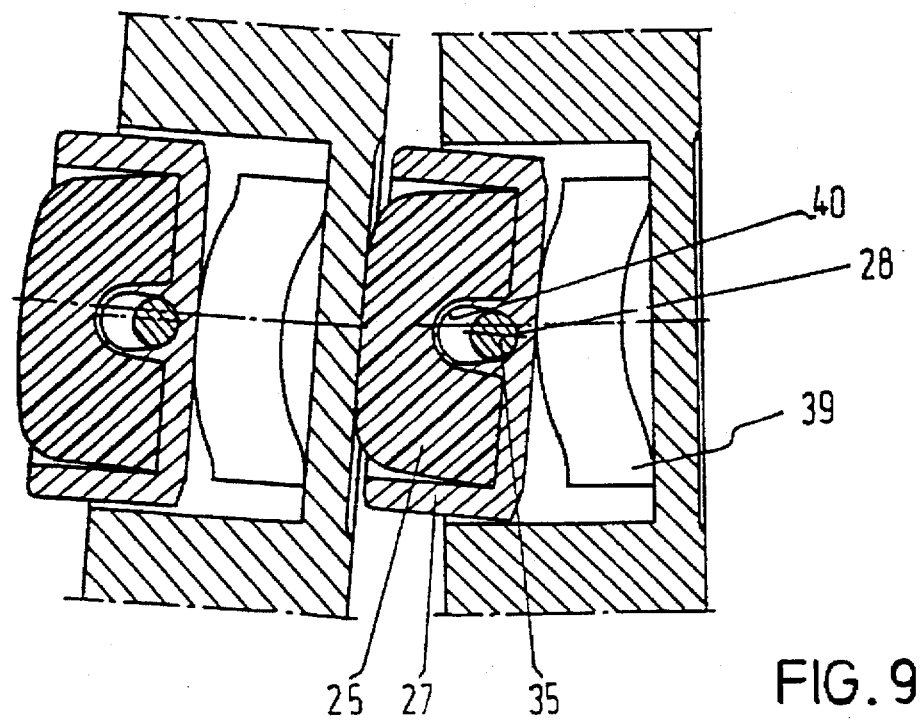
FIG. 9 shows a representation to explain the functioning of the shock absorber device according to the invention on bends and at reversals.

In order to improve said introduction of shocks into the impact element on bends too, the reception sleeve designated as a pot-shaped insertable reception part 27 can be pivoted about said holding bolt 35 at least in a small angular range, in order thereby to be adjusted to the collision angle, as shown diagrammatically by means of FIG. 9. As a result of the already mentioned conical widening of the slot 40 opposite to a stop 28 on the holding bolt 35 (on which the pot-shaped insertable reception elements [sic] 27 butts), the load on the holding bolt 35 under an oblique shock is avoided. The design and orientation of the leaf springs 39 are such that the convexly projecting part of the leaf springs 39 bears on the underside of the insertable reception part 27 preferably in the middle region of the latter adjacent to the holding bolt 35. As a result, the leaf springs oppose relatively little resistance to the pivoting movement of the pot-shaped insertable reception part 27, but said resistance is still at least so great that, after a shock has occurred during travel straight ahead, a return movement of the pot-shaped insertable reception part 27 into the neutral initial position shown in FIG. 3 is guaranteed again.

The shock absorber device according to the invention for running trolleys, particularly for a simultaneous stretching plant, thus has an at least two-stage shock absorber design, using a first and a second shock absorber means 21, 23, the second shock absorber means being activatable only after a release limit force $F_{2min}$ is exceeded, said shock absorber device being distinguished primarily by the following features:

the first shock absorber means 21 has an elastomeric insert 25 which projects above an edge of an insertable reception part 27, said edge forming a stop 29, the elastomeric insert 25 being compressed and/or deformed in volume as far as the plane of the stop 29 when a limit force $F_{1max}$ is exceeded, the second shock absorber means 23 consists of a compression spring means 39 which can be activated only after the release limit force $F_{2min}$ is exceeded, and the first and the second shock absorber means 21, 23 are designed in such a way that a force jump $\Delta F$ occurs between the limit force $F_{1max}$ at the end of the range of effectiveness of the first shock absorber means 21 and the release limit force $F_{2min}$ when the second shock absorber means 23 begins to take effect, said force jump serving for exact bearing contact and therefore a specific distance between the running trolleys 1 which, during normal operation, exert load on the shock absorber device in a force range $\Delta VK$ above the limit force $F_{1max}$ and below the release limit force $F_{2min}$.

We claim:

1. A shock absorber device for running trolleys, comprising:

first and second shock absorbers carried by said device, said second shock absorber being activatable only after a minimum release limit force value is exceeded, said first shock absorber being deactivated when a maximum shock absorption value is reached;

said first and second shock absorbers having spring characteristics affording a differential force value between said minimum value for activating said second shock absorber and said maximum value for deactivating said first shock absorber, said minimum value being greater than said maximum value such that a propulsive force for advancing the running trolleys is higher than said maximum shock absorber value at an end of a range of effectiveness of said first shock absorber and lower than said minimum release value at commencement of a range of effectiveness of said second shock absorber.

2. A shock absorber device according to claim 1 wherein said second shock absorber is reversible in its operating range.

3. A shock absorber device according to claim 1 wherein at least one of said first and second shock absorbers includes energy converting damping elements.

4. A shock absorber device according to claim 1 wherein at least one of said first and second shock absorbers is pivotal relative to another of said shock absorbers.

5. A shock absorber device according to claim 4 including a holding bolt, said first shock absorber being pivotal relative to said second shock absorber about said holding bolt and in a direction of a curved path.

6. A shock absorber device according to claim 1 wherein said first shock absorber has an elastomeric insert and an insert receiving element, said insert projecting outwardly of an edge of said receiving element, said edge forming a stop and defining a plane, said elastomeric insert being compressed or deformed in volume as far as the plane of said stop when said maximum shock absorber value is exceeded.

7. A shock absorber device according to claim 1 wherein said second shock absorber includes a leaf spring assembly.

8. A shock absorber device according to claim 7 wherein said leaf spring assembly has a convex projecting portion bearing on an underside of said first shock absorber.

9. A shock absorber device according to claim 1 including a holding bolt, said first shock absorber being pivotal relative to said second shock absorber about said holding bolt and in a direction of a curved path within defined limits wherein, in a collision-free state of the running trolley, return forces act on said first shock absorber as a result of said second shock absorber such that said first pivotal shock absorber is maintained in a neutral initial position oriented normal to the axis of said bolt and substantially medially of the curved path limits.

10. A shock absorber device according to claim 1 wherein said first shock absorber has a bore, a holding bolt projecting through said bore defining a tilt axis for tilting said first shock absorber relative to said second shock absorber, said bore being provided in a transverse direction relative to the tilting axis and in the direction of pre-stressing forces on said second shock absorber, said bore including a widened bore portion enabling relative displacement of said first shock absorber relative to said second shock absorber.

11. A shock absorber device according to claim 10 wherein said widened bore portion of said bore is widened in cross-section in a generally pear-shaped configuration so that when said first shock absorber is displaced counter to a force bearing on said second shock absorber, said holding bolt can be inserted through said bore, said holding bolt having a projecting collar on an end portion thereof, the outside diameter of said collar being equal to or smaller than the widened bore portion and larger than a bore portion of the bore provided with a smaller diameter in relation to said widened bore portion.

12. A shock absorber device according to claim 1 including a third shock absorber.

13. A shock absorber device according to claim 12 wherein said third shock absorber is reversible and has a shock absorbing effect.

* * * * *